United States Patent [19]

Nicol

[11] Patent Number: 4,607,853
[45] Date of Patent: Aug. 26, 1986

[54] SEALING CAP FOR USE IN INTERNAL CLEANING OF CAN FILLERS

[75] Inventor: Stuart Nicol, Edinburgh, Scotland

[73] Assignee: Scottish & Newcastle Breweries PLC, Edinburgh, Scotland

[21] Appl. No.: 651,794

[22] Filed: Sep. 18, 1984

[30] Foreign Application Priority Data

Sep. 20, 1983 [GB] United Kingdom ............... 8325172

[51] Int. Cl.⁴ .................................. F16J 15/06
[52] U.S. Cl. .................................. 277/12; 277/198; 277/217; 277/237 R
[58] Field of Search ............... 277/217, 237 R, 12, 277/32, 192, 198, 199

[56] References Cited

FOREIGN PATENT DOCUMENTS 183608 5/1954 Austria .................................. 277/217
933698 1/1948 France .................................. 277/217

Primary Examiner—Robert S. Ward
Attorney, Agent, or Firm—Ratner & Prestia

[57] ABSTRACT

A sealing cap for use in sealing the can filling head of can filling apparatus to allow cleaning fluid to be pumped through the head. The sealing cap closes off the head in substitution for a can and comprises a sealing member rotatably mounted within a threaded retaining ring adapted to be screwed onto a threaded outer surface of the can filling head. This configuration allows easy fitment of the sealing cap during head cleaning operations.

6 Claims, 4 Drawing Figures

SEALING CAP FOR USE IN INTERNAL CLEANING OF CAN FILLERS

This invention relates to a sealing cap for use in the internal cleaning of can filling apparatus.

Can filling apparatus comprise a number of can filling heads mounted on a common framework. These can filling heads have to be cleaned regularly and when cleaning is to be carried out it has previously been the practice to fit a plastics material cap over the filling heads to seal the head and allow a cleaning fluid to be pumped through the apparatus. These known caps have been a clip fit on the filling heads with inwardly facing protrusions on the cap engaging a groove formed on the outer surface of the filling head assembly. This type of fitting is necessary as the cap has to be able to withstand the high pressure of the cleaning fluid being forced through the machine. These known caps have the disadvantage that the clip fittings often tend to break when the cap is removed after cleaning.

It is an object of the present invention to obviate or mitigate the above disadvantages and provide a sealing cap which is easy to manufacture and use.

According to the present invention there is provided a sealing cap for use in the internal cleaning of can filling apparatus and adapted to be fitted to the can filling head of the apparatus, the sealing cap comprising a sealing member rotatably mounted within a threaded retaining ring adapted to be screwed onto a threaded outer surface of the can filling head.

Preferably, the sealing member of the cap sealably engages a seal already provided within the can filler head for sealing a can being filled.

Embodiments of the present invention will now be described, by way of example, with reference to the accompanying drawings, in which.

Figure 1:
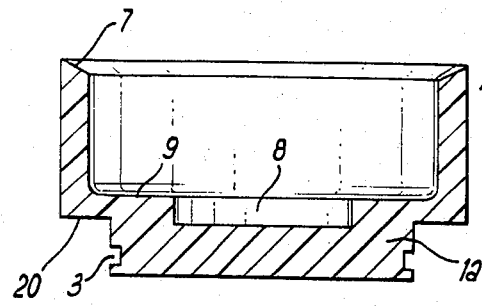
FIG. 1 is a sectional side view of a sealing member of a sealing cap made in accordance with the present invention.
Figure 2:
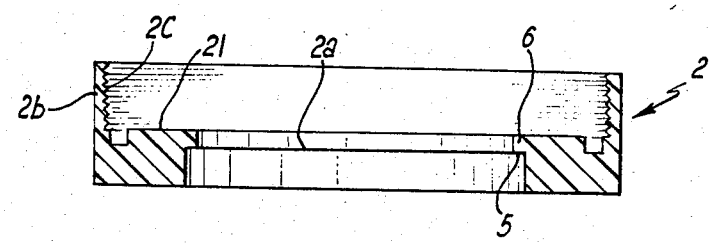
FIG. 2 is a sectional side view of a retaining ring for use with the sealing member of FIG. 1.
Figure 3:
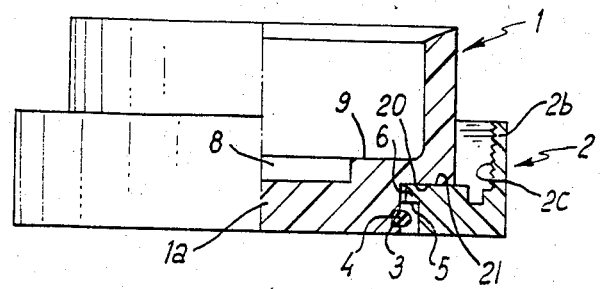
FIG. 3 is a part sectional side view of an assembled sealing cap showing the sealing member of FIG. 1 and the retaining ring of FIG. 2 fitted together.

Referring to FIGS. 1 to 3 of the drawings, a sealing cap for use in the internal cleaning of can filling apparatus comprises a plastics material sealing member 1 and a plastics material retaining ring 2. The sealing member 1 is rotatably mounted within the retaining ring 2 by way of a cylindrical lower portion 1a of the member 1 extending through a central bore 2a of the retaining ring 2. A downwardly facing surface 20 on the sealing member 1 bears against an upwardly facing surface 21 on the retaining ring 2 and a groove 3 in the cylindrical lower portion 1a of the member 1 serves as a seating for an 'O' ring 4. The 'O' ring 4 bears against a lower surface 5 of an annular ledge 6 in the central bore 2a of the retaining ring 2 and thus rotatably locates the sealing member 1 within the retaining ring 2. A cylindrical upper portion 2b of the retaining ring 2 is provided with an internal thread 2c formed on its inwardly facing surface and the lower portion 1a of the cap 1 has a circular recess 8 formed in an upper surface 9.

Examples of suitable plastics materials for the sealing cap are Nylatron G.S.M. for the sealing member and rotating ring or Ertalon G.S.A. for the sealing member and Ertacetal 'C' for the rotating ring.

Figure 4:
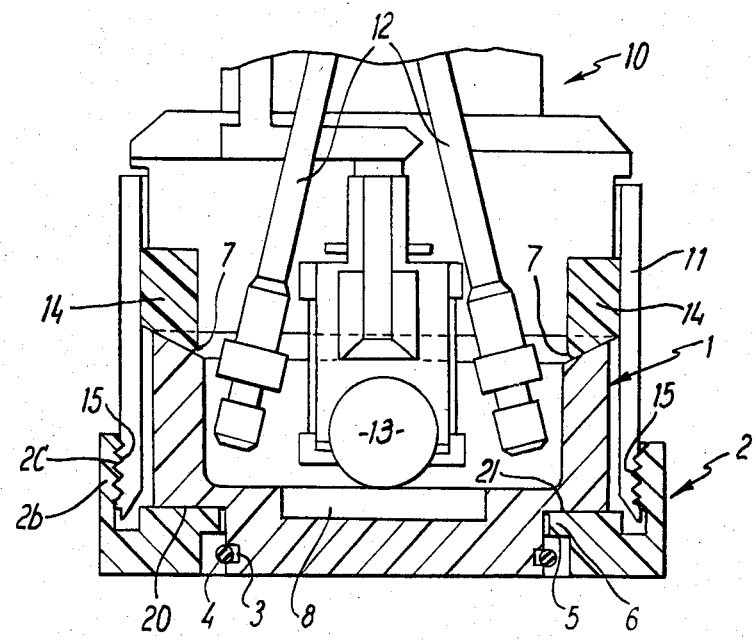
FIG. 4 is a part sectional side view showing the cap of FIG. 3 fitted to the filling head of can filling apparatus.

Referring now to FIG. 4, a can filler head 10 of can filling apparatus has an outer cover 11, liquid injectors 12 and a gas valve 13. An annular can seal 14 is fitted to the inside of the cover 11 and the cover 11 has a thread 15 cut on its outer surface.

In use, the sealing cap assembly is first fitted to the can filler head 10 with the upper portion 2b of the retaining ring 2 threaded onto the cover 11 of the can filler head 10, the internal thread 2c on the ring 2 engaging the external thread 15 on the cover 11. As the retaining ring 2 is screwed onto the cover 11, face 21 on the ring 2 bears against the face 20 on the sealing member 1. The sealing member 1 is thus forced upwards so that an annular bevelled sealing surface 7, of the member 1 comes into contact with and seals against the rubber seal 14 in the cover 11. The recess 8 in the cap 1 provides clearance for the gas valve 13. The cap is now held firmly in position on the operating head 10 and the seal 14 provides a liquid tight seal against the sealing surface 7. Cleaning fluid can then be pumped through the gas valve 13 into the liquid injectors 12. After use, the sealing member 1 and retaining ring 2 assembly can be easily removed without damage and be stored ready for their next use.

In most cases, can filling apparatus have a large number of can filling heads 10. In these cases a corresponding number of cap and retaining ring assemblies are provided and these can be quickly and easily fitted one to each can filling head 10.

The sealing cap of the invention can be used a large number of times and requires little maintenance the seal being provided by the existing can seal 14 in the can filling head itself.

Modifications and improvements may be incorporated without departing from the scope of the invention. I claim:

1. A sealing cap for use in the internal cleaning of a can filling apparatus and adapted to be fitted to the head of the can filling apparatus, the sealing cap comprising:
    a sealing member and a threaded retaining ring, the sealing member being rotatably mounted within the threaded retaining ring which is adapted to be screwed onto a threaded outer surface of the can filling head;
    the sealing member being provided with a cylindrical lower portion adapted to be received within a circular aperture formed in the retaining ring; and
    the sealing member being rotatably held within the retaining ring by means of an O-ring located in a groove on said cylindrical lower portion.

2. A sealing cap as claimed in claim 1, wherein the sealing member is provided with a sealing surface which in use, engages a seal already provided within the can filler head for sealing a can being filled.

3. A sealing cap as claimed in claim 1, wherein the sealing member and retaining ring as formed of plastics material.

4. A sealing cap as claimed in claim 3, wherein said plastics material is Nylatron G.S.M.

5. A sealing cap as claimed in claim 3, wherein said plastics material is Ertalon G.S.A.

6. A sealing cap as claimed in claim 3, wherein said plastics material is Ertacetal 'C'.

* * * * *